US012438863B2

(12) United States Patent
Albero et al.

(10) Patent No.: US 12,438,863 B2
(45) Date of Patent: *Oct. 7, 2025

(54) EMAIL VERIFICATION USING INJECTED TOKENS FOR MESSAGE AUTHENTICATION

(71) Applicant: Bank of America Corporation, Charlotte, NC (US)

(72) Inventors: George Albero, Charlotte, NC (US); Maharaj Mukherjee, Poughkeepsie, NY (US); Benjamin D. Moores, Ventura, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,066

(22) Filed: Jun. 27, 2024

(65) Prior Publication Data
US 2024/0348593 A1    Oct. 17, 2024

Related U.S. Application Data

(63) Continuation of application No. 17/481,674, filed on Sep. 22, 2021, now Pat. No. 12,088,572.

(51) Int. Cl.
H04L 9/40 (2022.01)
G06F 40/40 (2020.01)
H04L 51/224 (2022.01)

(52) U.S. Cl.
CPC ............. *H04L 63/08* (2013.01); *G06F 40/40* (2020.01); *H04L 51/224* (2022.05); *H04L 63/126* (2013.01)

(58) Field of Classification Search
CPC ..... H04L 63/08; H04L 51/224; H04L 63/126; H04L 51/212; H04L 63/0807; G06F 40/40; G06F 21/44; G06F 21/606
See application file for complete search history.

(56) References Cited

U.S. PATENT DOCUMENTS 7,290,035 B2  10/2007  Mattathil
7,437,558 B2  10/2008  Fenton et al.
(Continued)

FOREIGN PATENT DOCUMENTS

TW        201737658 A      10/2017

OTHER PUBLICATIONS

Dec. 19, 2023—(US) Office Action—U.S. Appl. No. 17/481,674.
May 21, 2024—(US) Notice of Allowance—U.S. Appl. No. 17/481,674.

*Primary Examiner* — Hany S. Gadalla
(74) *Attorney, Agent, or Firm* — Banner & Witcoff, Ltd.

(57) ABSTRACT

Aspects of the disclosure relate to message validation. A computing platform may receive a message, sent by a first device and directed to a second device, from an electronic messaging server. The computing platform may verify, based on message sender details, an identity of a sender of the message. The computing platform may generate, after verifying the identity of the sender of the message, an authentication token for the message, and may inject the authentication token into the message. The computing platform may route, to the electronic messaging server and after injecting the authentication token into the message, the message. The computing platform may receive a request to validate the message, which may include the authentication token and details of the message. The computing platform may identify, using the authentication token and the details of the message, that the message is authenticated.

20 Claims, 9 Drawing Sheets

(56) References Cited

U.S. PATENT DOCUMENTS

| | | |
|---|---|---|
| 7,442,115 B1 | 10/2008 | Brenny et al. |
| 8,171,085 B1 | 5/2012 | Tevanian, Jr. |
| 9,628,412 B2 | 4/2017 | St. Clair et al. |
| 9,781,149 B1 | 10/2017 | Himler et al. |
| 9,912,687 B1 | 3/2018 | Wescoe et al. |
| 10,110,530 B2 | 10/2018 | Sachtjen |
| 10,699,234 B1 | 6/2020 | Richards et al. |
| 10,715,327 B1 | 7/2020 | Ramanujan et al. |
| 10,805,270 B2 | 10/2020 | Jakobsson et al. |
| 10,805,314 B2 | 10/2020 | Jakobsson et al. |
| 10,834,127 B1 | 11/2020 | Yeh et al. |
| 10,880,322 B1 | 12/2020 | Jakobsson et al. |
| 10,992,645 B2 | 4/2021 | Jakobsson et al. |
| 11,010,818 B2 | 5/2021 | Custer |
| 11,019,076 B1 | 5/2021 | Jakobsson et al. |
| 11,044,267 B2 | 6/2021 | Jakobsson et al. |
| 11,593,773 B1 | 2/2023 | Yip et al. |
| 11,631,021 B1* | 4/2023 | Benjamin .............. G06Q 50/18 704/1 |
| 2015/0332365 A1 | 11/2015 | Kassemi et al. |
| 2016/0321652 A1 | 11/2016 | Dimmick et al. |
| 2017/0178124 A1* | 6/2017 | Havilio ................ G06Q 20/382 |
| 2018/0102947 A1 | 4/2018 | Bhaya et al. |
| 2018/0191499 A1 | 7/2018 | Sachtjen et al. |
| 2018/0337896 A1 | 11/2018 | Frankel et al. |
| 2019/0020478 A1 | 1/2019 | Girish et al. |
| 2019/0122220 A1 | 4/2019 | Phillips et al. |
| 2020/0034813 A1 | 1/2020 | Calinog et al. |
| 2020/0067976 A1 | 2/2020 | Jakobsson |
| 2020/0137081 A1 | 4/2020 | Goldstein |
| 2020/0287885 A1 | 9/2020 | Rodniansky |
| 2021/0182859 A1* | 6/2021 | Srinivasa Rao ... G06Q 20/4016 |
| 2022/0084036 A1* | 3/2022 | He .................... G06Q 20/4016 |
| 2022/0182242 A1 | 6/2022 | Jaquette et al. |

* cited by examiner

405

Message Interface

Hello, please find our invoice attached.

Sincerely, Individual #1

*Note: for validation purposes, an authentication token is attached to this message. Please validate the token using the link below:*

Message Validation Service

Message Interface

Hello, please find our invoice attached.

Sincerely, Individual #1

*Note: this message has been validated.*

FIG. 5

EMAIL VERIFICATION USING INJECTED TOKENS FOR MESSAGE AUTHENTICATION

CROSS-REFERENCE TO RELATED APPLICATION

This application is a continuation of U.S. Ser. No. 17/481,674 filed on Sep. 22, 2021, which is entitled "Email Verification Using Injected Tokens for Message Authentication" which is incorporated by reference herein in its entirety.

BACKGROUND

Aspects of the disclosure relate to message authentication. In some cases, electronic messages may be spoofed and/or otherwise corrupted in transit. Such messages may include or otherwise facilitate the spread of malware and/or otherwise pose network security threats. In some instances, network security training and/or knowledgeable information security teams may be implemented in an attempt to prevent such threats. Such methods may, however, be costly and/or error prone (e.g., due to the manual nature of such methods), which may result in undetected network security threats for individuals and/or enterprise organizations. Additionally, in some instances, image comparison methods may be used. Such methods, however, may similarly be error prone as sophisticated spoofers may be able to accurately replicate images (e.g., corporate logos, marks, or the like) and avoid detection of discrepancies between spoofed/impersonated messages and valid messages.

SUMMARY

Aspects of the disclosure provide effective, efficient, scalable, and convenient technical solutions that address and overcome the technical problems associated with message verification. In accordance with one or more embodiments of the disclosure, a computing platform comprising at least one processor, a communication interface, and memory storing computer-readable instructions may receive a message from an electronic messaging server, where the message is sent by a first device and directed to a second device. The computing platform may verify, based on message sender details, an identity of a sender of the message. The computing platform may generate, after verifying the identity of the sender of the message, an authentication token for the message. The computing platform may inject the authentication token into the message. After injecting the authentication token into the message, the computing platform may route the message to the electronic messaging server. The computing platform may receive, from the second device, a request to validate the message, which may include the authentication token and details of the message. The computing platform may identify, using the authentication token and the details of the message, that the message is authenticated. The computing platform may send, to the second device, a message authentication notification and one or more commands directing the second device to display the message authentication notification along with the message, which may cause the second device to display the message authentication notification along with the message.

In one or more instances, the computing platform may identify, prior to verifying the identity of the sender of the message, that the authentication token should be injected into the message, which may include identifying that the authentication token should be injected into all outgoing messages. In one or more instances, the computing platform may identify, prior to verifying the identity of the sender of the message, that the authentication token should be injected into the message, which may include identifying that the authentication token should be injected based on analysis of one or more of: sender information, recipient information, or message information associated with the message.

In one or more instances, the sender information may include one or more of: a name of the sender, an email address of the sender, a job title of the sender, and a message encryption history of the sender, and the recipient information may include one or more of: a name of a recipient, an email address of the recipient, and a job title of the recipient. In one or more instances, the computing platform may identify, using one or more machine learning algorithms, the message encryption history of the sender, where the message encryption history of the sender indicates one or more of: keywords, recipients, or message context associated with previously sent messages from the sender that included an authentication token.

In one or more instances, the message context may be identified using one or more of: natural language understanding (NLU) algorithms and natural language processing (NLP) algorithms. In one or more instances, the computing platform may generate a message encryption score for the message. The computing platform may compare the message encryption score to a message encryption threshold. Based on identifying that the message encryption score exceeds the message encryption threshold, the computing platform may identify that the authentication token should be injected.

In one or more instances, receiving the request to validate the message may include receiving a request from an automated electronic messaging plug-in that identified the authentication token in the message. In one or more instances, the details of the message may include one or more of: a timestamp, a presence of an attachment, a presence of a hyperlink, and text of the message.

In one or more instances, the message may be displayed at the second device prior to identification that the message is authenticated. The message may include one or more quarantined components. The one or more quarantined components may include one of more of: a hyperlink and an attachment. Sending the message authentication notification and the one or more commands directing the second device to display the message authentication notification along with the message may cause the quarantine to be removed from the one or more quarantined components.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces that uses token injection for message authentication in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to message authentication. Using current systems, it may be difficult to determine if an email and its contents are coming from the actual sender displayed. For example, spoofing of a person's internal and external emails may create security issues when individuals respond, click links, or otherwise interact with such emails and thus bring malware into a network. Current methods for addressing these issues include employee training and information security teams, which try to catch these events as they come in. However, these events may be expensive and/or error prone, and thus may leave individuals and/or enterprises vulnerable to such attacks.

Accordingly, described herein is a validator email verification system that may confirm the validity of email. Emails sent by recipients in the "validator network" may generate a random alpha-numeric code. The alpha-numeric code may be entered by the recipient in the validator system. The validator system may authenticate the email and may display various characteristics such as sender, subject, date, time, hyperlinks, attachments, and/or other characteristics. The validator may also alert the sender of suspicious emails (e.g., using a fraud alert, or other notification). The code may also validate the type of material authorized (e.g., proprietary or confidential information may be received from an external source affiliated with an enterprise with whom a non-disclosure agreement has not yet been signed). The validator may automatically review the code and display the aforementioned characteristics. The validator may quarantine inbound emails and provide the information to the intended recipient to allow them to accept or reject based on pictures, inappropriate content, and/or other information. Third-party vendors, trusted business partners, clients, and/or other parties may opt into the validator network to generate and receive validator codes.

These and other features are described in further detail below.

Figure 1A:
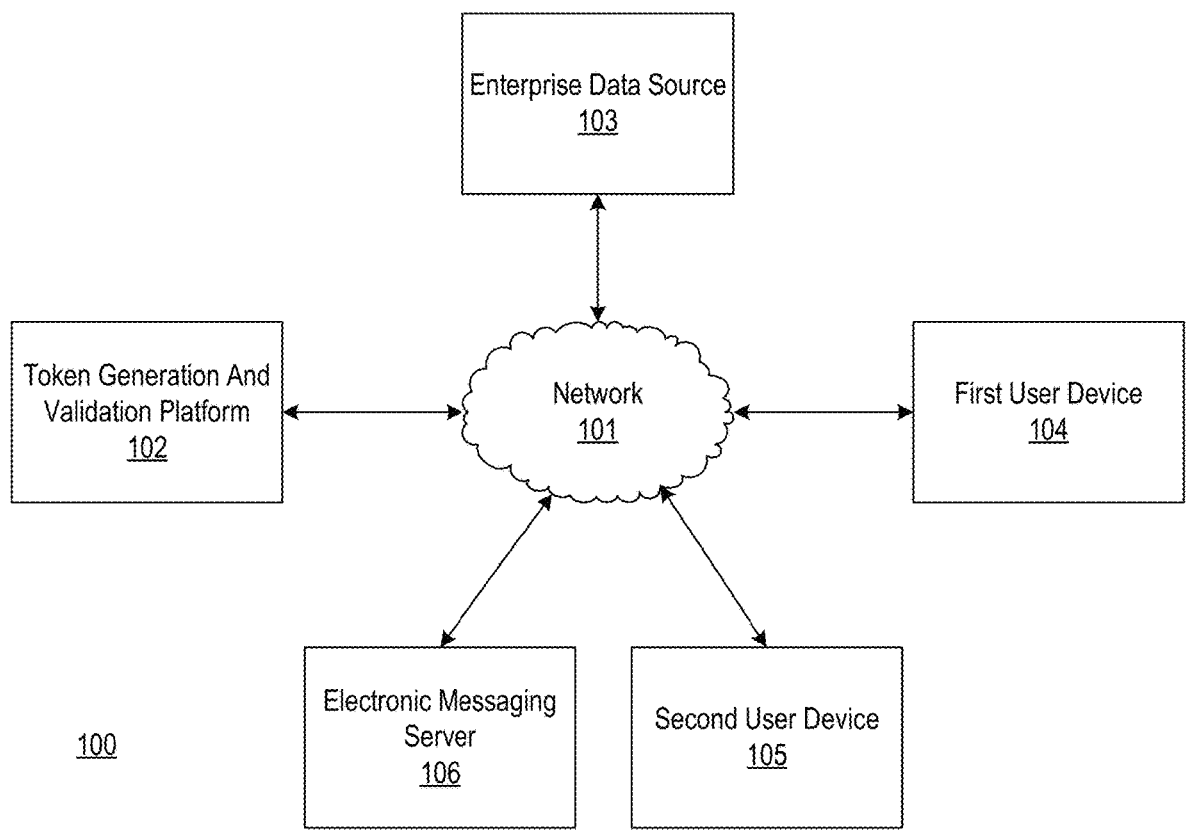
FIGS. 1A-1B depict an illustrative computing environment that uses token injection for message authentication in accordance with one or more example embodiments.
Figure 1B:
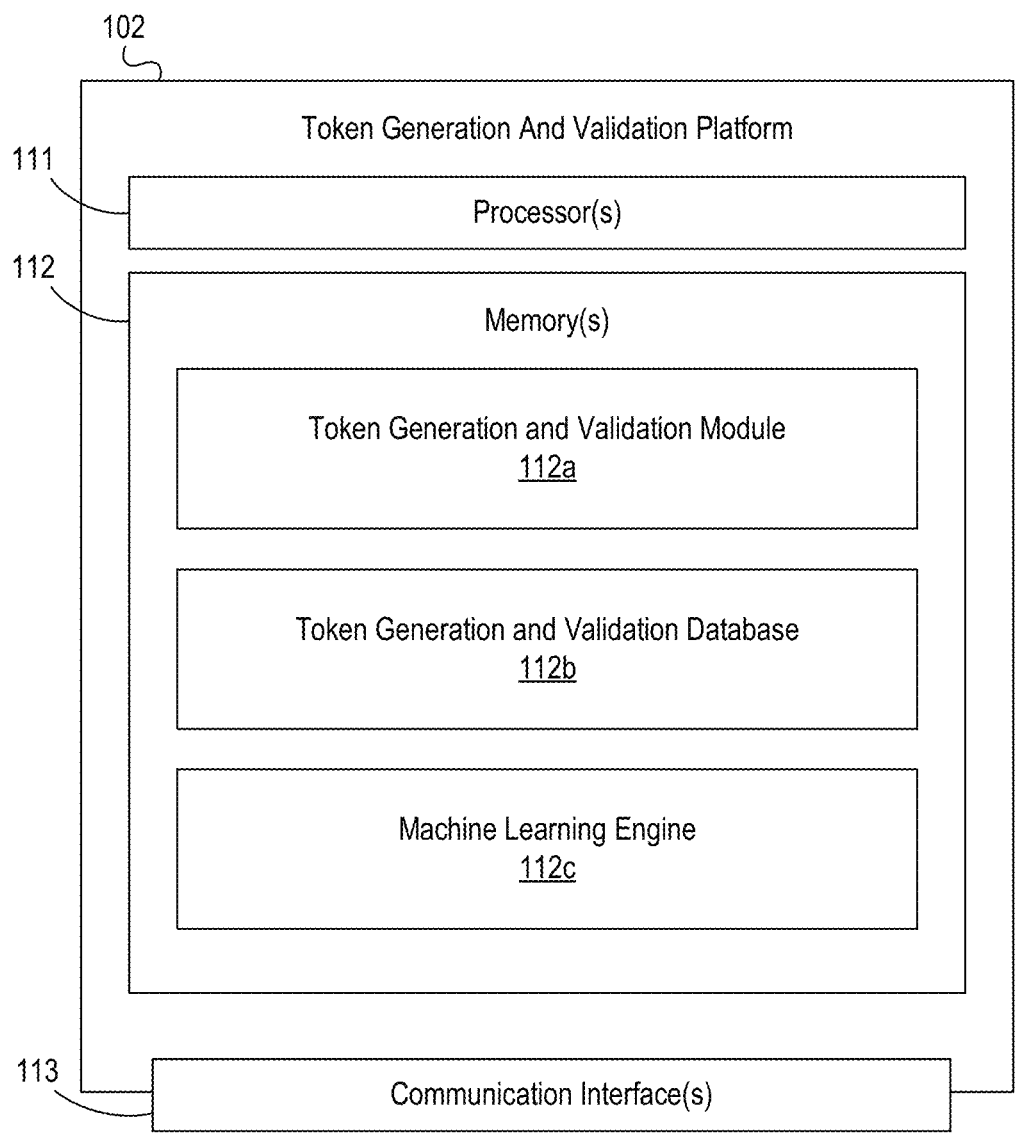

FIGS. 1A-1B depict an illustrative computing environment that uses token injection for message authentication in accordance with one or more example embodiments. Referring to FIG. 1A, computing environment 100 may include one or more computer systems. For example, computing environment 100 may include token generation and validation platform 102, enterprise data source 103, first user device 104, second user device 105, and electronic messaging server 106.

As described further below, token generation and validation platform 102 may be a computer system that includes one or more computing devices (e.g., servers, server blades, or the like) and/or other computer components (e.g., processors, memories, communication interfaces) that may be used to generate, inject, validate, and/or otherwise process authentication tokens for electronic message verification.

Enterprise data source 103 may be a computer system that includes one or more computing devices (e.g., servers, server blades, or the like) and/or other computer components (e.g., processors, memories, communication interfaces) that may store, share, and/or otherwise provide information corresponding to employees of an enterprise organization (e.g., for which the token generation and validation platform 102 is deployed) and/or other individuals who have opted into the token generation and validation service (e.g., customers, external vendors, and/or other individuals).

First user device 104 may be a laptop computer, desktop computer, mobile device, tablet, smartphone, and/or other device that may be used by an individual to send and/or receive electronic messages. In some instances, first user device 104 may be operated by an enterprise employee, a customer, an employee of a vendor for the enterprise, and/or other individuals. In some instances, first user device 104 may be configured to display one or more user interfaces (e.g., an electronic message inbox, electronic messages, or the like).

Second user device 105 may be a laptop computer, desktop computer, mobile device, tablet, smartphone, and/or other device that may be used by an individual to send and/or receive electronic messages. In some instances, second user device 105 may be operated by an enterprise employee, a customer, an employee of a vendor for the enterprise, and/or other individuals. In some instances, second user device 105 may be configured to display one or more user interfaces (e.g., an electronic message inbox, electronic messages, or the like).

Electronic messaging server 106 may be or include one or more servers configured to facilitate the exchange of electronic messages between user accounts (which may e.g., be accessed on various user devices such as first user device 104, second user device 105, and/or other devices).

Computing environment 100 also may include one or more networks, which may interconnect token generation and validation platform 102, enterprise data source 103, first user device 104, second user device 105, and/or electronic messaging server 106. For example, computing environment 100 may include a network 101 (which may interconnect, e.g., token generation and validation platform 102, enterprise data source 103, first user device 104, second user device 105, and/or electronic messaging server 106).

In one or more arrangements, token generation and validation platform 102, enterprise data source 103, first user device 104, second user device 105, and/or electronic messaging server 106 may be any type of computing device capable of sending and/or receiving requests and processing the requests accordingly. For example, token generation and validation platform 102, enterprise data source 103, first user device 104, second user device 105, electronic messaging server 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of token generation and validation platform 102, enterprise data source 103, first user device 104, second user device 105, and/or electronic messaging server 106 may, in some instances, be special-purpose computing devices configured to perform specific functions.

Referring to FIG. 1B, token generation and validation platform 102 may include one or more processors 111, memory 112, and communication interface 113. A data bus may interconnect processor 111, memory 112, and communication interface 113. Communication interface 113 may be a network interface configured to support communication between token generation and validation platform 102 and one or more networks (e.g., network 101, or the like). Memory 112 may include one or more program modules having instructions that when executed by processor 111 cause token generation and validation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of token generation and validation platform 102 and/or by different computing devices that may form and/or otherwise make up token generation and validation platform 102. For example, memory 112 may have, host, store, and/or include token generation and validation module 112a, token generation and validation database 112b, and/or machine learning engine 112c.

Token generation and validation module 112a may have instructions that direct and/or cause token generation and validation platform 102 to generate, inject, and validate authentication tokens for message verification, as discussed in greater detail below. Token generation and validation database 112b may store information used by token generation and validation module 112a and/or token generation and validation platform 102 in application of advanced techniques to generate tokens, validate tokens, and/or in performing other functions. Machine learning engine 112c may comprise or otherwise be used by the token generation and validation platform 102 to identify validation patterns, verified senders/messages, unverified senders/messages, and/or to iteratively refine and/or otherwise optimize datasets and/or algorithms that may be used to provide such automated message verification.

Figure 2A:
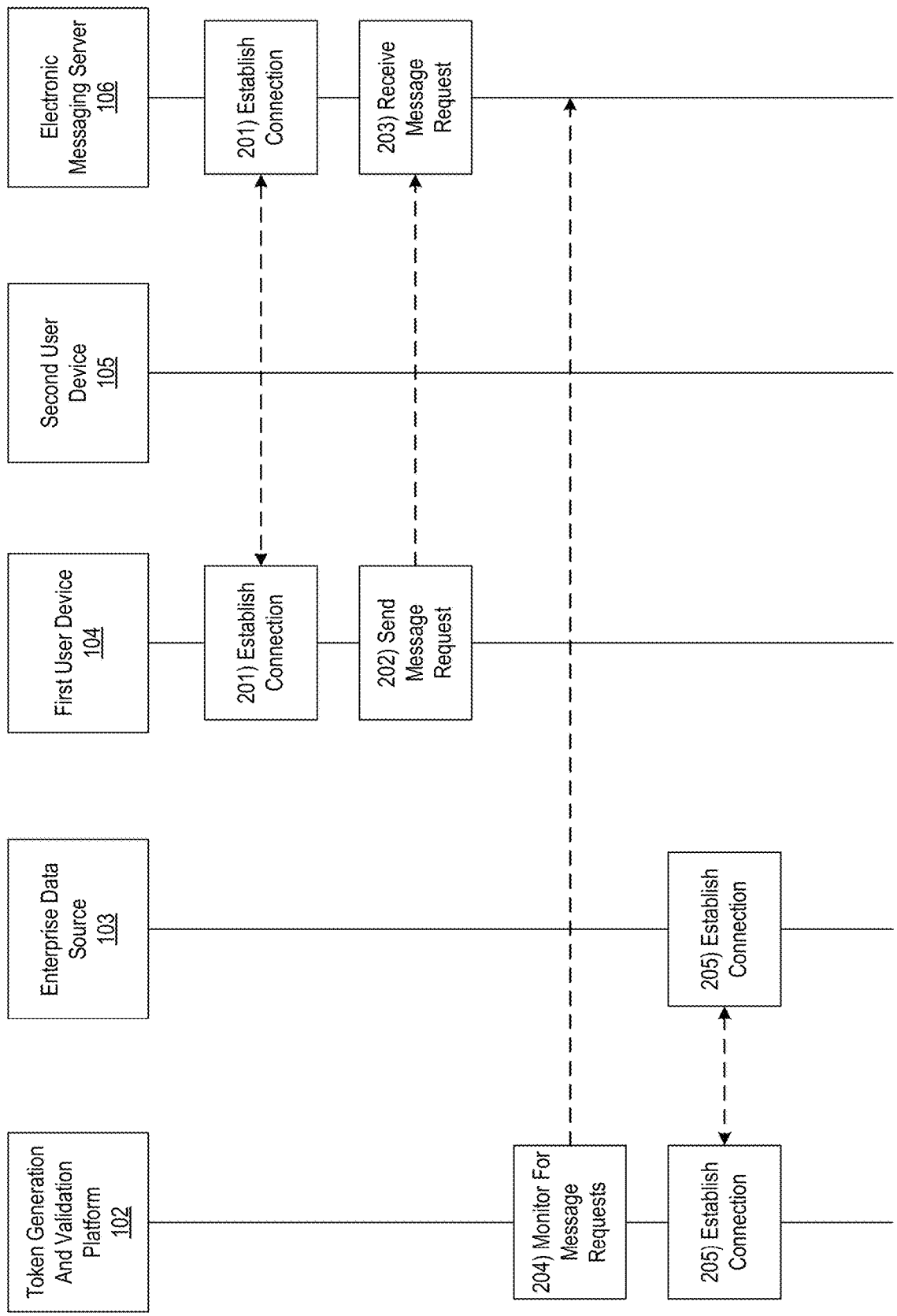
FIGS. 2A-2E depict an illustrative event sequence that uses token injection for message authentication in accordance with one or more example embodiments.

FIGS. 2A-2E depict an illustrative event sequence that uses token injection for message authentication in accordance with one or more example embodiments. Referring to FIG. 2A, at step 201, the first user device 104 may establish a connection with the electronic messaging server 106. For example, the first user device 104 may establish a first wireless data connection with the electronic messaging server 106 to link the first user device 104 to the electronic messaging server 106 (e.g., in preparation for sending a message request). In some instances, the first user device 104 may identify whether or not a connection is already established with the electronic messaging server 106. If a connection is already established with the electronic messaging server 106, the first user device 104 might not re-establish the connection. If a connection is not yet established with the electronic messaging server 106, the first user device 104 may establish the first wireless data connection as described herein.

At step 202, the first user device 104 may send a message request to the electronic messaging server 106. For example, the first user device 104 may send an electronic message (e.g., an email or other message) to the electronic messaging server 106, and may include, in the electronic message, a request to route that message to a particular individual (e.g., an account for the individual). In some instances, the first user device 104 may send the electronic message to the electronic messaging server 106 while the first wireless data connection is established.

At step 203, the electronic messaging server 106 may receive the message request sent at step 202. For example, the electronic messaging server 106 may receive the message request while the first wireless data connection is established.

At step 204, the token generation and validation platform 102 may monitor the electronic messaging server 106 to identify new message requests. For example, the token generation and validation platform 102 may monitor the electronic messaging server 106 at a predetermined interval to identify whether or not additional message requests have been received since the previous monitoring instance.

At step 205, the token generation and validation platform 102 may establish a connection with the enterprise data source 103. For example, the token generation and validation platform 102 may establish a second wireless data connection with the enterprise data source 103 to link the token generation and validation platform 102 with the enterprise data source 103 (e.g., in preparation for requesting sender details). In some instances, the token generation and validation platform 102 may identify whether or not a connection is already established with the enterprise data source 103. If a connection is already established with the enterprise data source 103, the token generation and validation platform 102 might not re-establish the connection. If a connection is not yet established, the token generation and validation platform 102 may establish the second wireless data connection as described herein.

Figure 2B:
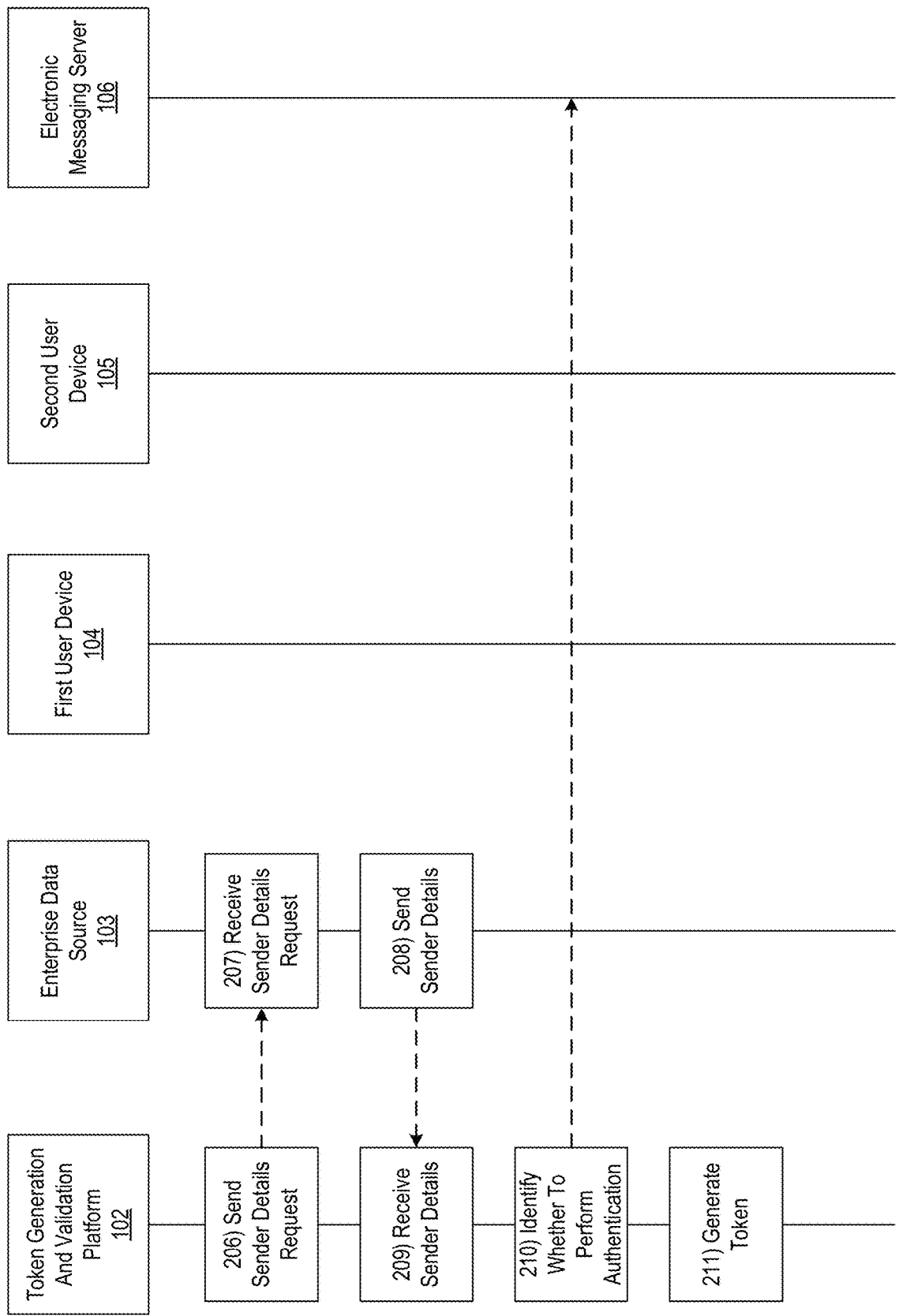

Referring to FIG. 2B, at step 206, the token generation and validation platform 102 may send a request for sender details to the enterprise data source 103. For example, the token generation and validation platform 102 may request information corresponding to the message sender such as a name, job title (e.g., recruitment, human resources, accounting, and/or other job titles), affiliation with the enterprise (e.g., employee, contractor, client, and/or other affiliations), machine names (e.g., affiliated with the sender), historical message contexts (e.g., whether messages from the sender typically include images, numbers, attachments, and/or other information) and/or other information that may be used to identify whether or not messages from the sender (such as the message request sent at step 201) should include an authentication measure. In some instances, the token generation and validation platform 102 may send the request for sender details via the communication interface 113 and while the second wireless data connection is established.

At step 207, the enterprise data source 103 may receive the request for sender details. For example, the enterprise data source may receive the request for sender details while the second wireless data connection is established.

At step 208, the enterprise data source 103 may identify and send details of the message sender. For example, based on an email address of the message sender, the enterprise data source 103 may identify a name, job title, relationship to the enterprise (e.g., employee, customer, contractor, vendor, or the like), and/or other sender details. In doing so, the enterprise data source 103 may identify that the message sender is a verified sender (e.g., an employee of the enterprise, a verified client, a verified vendor, and/or other verified sender). The enterprise data source 103 may then send these sender details to the token generation and validation platform 102. For example, the enterprise data source 103 may send the sender details to the token generation and validation platform 102 while the second wireless data connection is established.

At step 209, the token generation and validation platform 102 may receive the sender details. For example, the token generation and validation platform 102 may receive the sender details via the communication interface 113 and while the second wireless data connection is established.

At step 210, the token generation and validation platform 102 may identify whether or not the message should include an authentication mechanism. In some instances, the token generation and validation platform 102 may identify that an authentication mechanism should be included with all electronic messages across the board (e.g., based on an enterprise wide policy). Alternatively, the token generation and validation platform 102 may identify that an authentication mechanism should be included selectively based on information associated with the message.

For example, in some instances, the token generation and validation platform 102 may identify whether or not an authentication mechanism should be applied based on the sender information. For example, in these instances, the token generation and validation platform 102 may have stored policies indicating sender characteristics that trigger the use of an authentication mechanism, such as a certain job title, department, name, affiliation with the enterprise organization (e.g., employee, vendor, customer, contractor, or the like). The token generation and validation platform 102 may compare the sender information with the stored policies to identify whether or not an authentication mechanism should be included in the message. In some instances, based on previously analyzed messages, a sender may be flagged, and thus an authentication mechanism may be used for this sender.

Additionally or alternatively, the token generation and validation platform 102 may identify whether or not an authentication mechanism should be included based on recipient information of the message (e.g., using similar techniques to those described above with regard to the sender information).

Additionally or alternatively, the token generation and validation platform 102 may identify whether or not an authentication mechanism should be included based on contents of the message. For example, the token generation and validation platform 102 may apply one or more of natural language processing, natural language understanding, and/or other machine learning techniques to identify contents of the message and its context. For example, the token generation and validation platform 102 may identify that the message includes confidential information, financial information, personal information, attachments, and/or other information for which policies indicate that an authentication mechanism should be used. Additionally or alternatively, the token generation and validation platform 102 may identify whether or not an authentication mechanism should be included based on user input. For example, the token generation and validation platform 102 may receive user input indicating that a message includes confidential information, and may identify that an authentication mechanism should be included accordingly.

Additionally or alternatively, the token generation and validation platform 102 may identify whether or not an authentication mechanism should be used based on identifying that a number of hops (e.g., involved in the transmission path of the message) exceeds a predetermined hop distance. For example, if the token generation and validation platform 102 identifies that the number of hops does exceed the predetermined hop distance (which may, e.g., make the message more vulnerable to attack), the token generation and validation platform 102 may identify that an authentication mechanism should be used. Otherwise, the token generation and validation platform 102 may identify that an authentication mechanism should not be used.

Additionally or alternatively, the token generation and validation platform 102 may identify that an authentication mechanism should be used based on identifying that the message is being received from or transmitted to an external email, that the message comprises an initial communication between the sender and the recipient, that the message involves a hiring decision or other confidential information, that the message includes financial implications or other investment information, that the message is requesting a trade, sale, or purchase of shares with a value that exceeds a threshold value, that the message includes a time sensitive and urgent request, and/or based on other information included in the message.

Additionally or alternatively, the token generation and validation platform 102 may identify, using one or more machine learning algorithms, NLU algorithms, NLP algorithms, and/or other techniques, the message encryption history of the sender, which may indicate one or more of keywords, recipients, or message context associated with previously sent messages from the sender that included an authentication mechanism. In some instances, in doing so, the token generation and validation platform 102 may identify a message encryption score for the message. For example, the token and validation platform 102 may use the following model to identify the message encryption score:

1. If # of matching keywords exceeds 3, a=0.3; if # of matching keywords exceeds 1, but not 3, a=0.15; otherwise, a=0.
2. If message recipient matches, b=1; otherwise, b=0.
3. If message context matches, b=0.5
4. Message encryption score (d)=a+b+c
5. If d is greater than or equal to 0.6, generate authentication mechanism.

This model is merely illustrative, and other similar models may be used without departing from the scope of this disclosure.

At step 211, the token generation and validation platform 102 may generate the authentication mechanism. For example, the token generation and validation platform 102 may generate an authentication token that may be embedded into the message. Additionally or alternatively, the token generation and validation platform 102 may generate an alpha-numeric code that may be included in the message. In some instances, the token generation and validation platform 102 may generate the authentication mechanism in an automated and random manner. In some instances, an electronic messaging inbox for the message recipient may include a plug-in, which may be hosted or otherwise provided by the token generation and validation platform 102, and may be used to generate the authentication mechanism. In some instances, the token generation and validation platform 102 may select an authentication mechanism based on a system configuration of the message recipient. For example, if the message recipient is affiliated with a system configuration that enables automated processing of the authentication token (e.g., an internal recipient or other recipient who has enrolled in the authentication service provided by the token generation and validation platform 102), an authentication token may be generated. Alternatively, if the message recipient is not affiliated with a system configuration that enables automated processing of the authentication token (e.g., an external recipient or other recipient who has not enrolled in the authentication service provided by the token generation and validation platform 102), an alpha-numeric code may be generated.

Figure 2C:
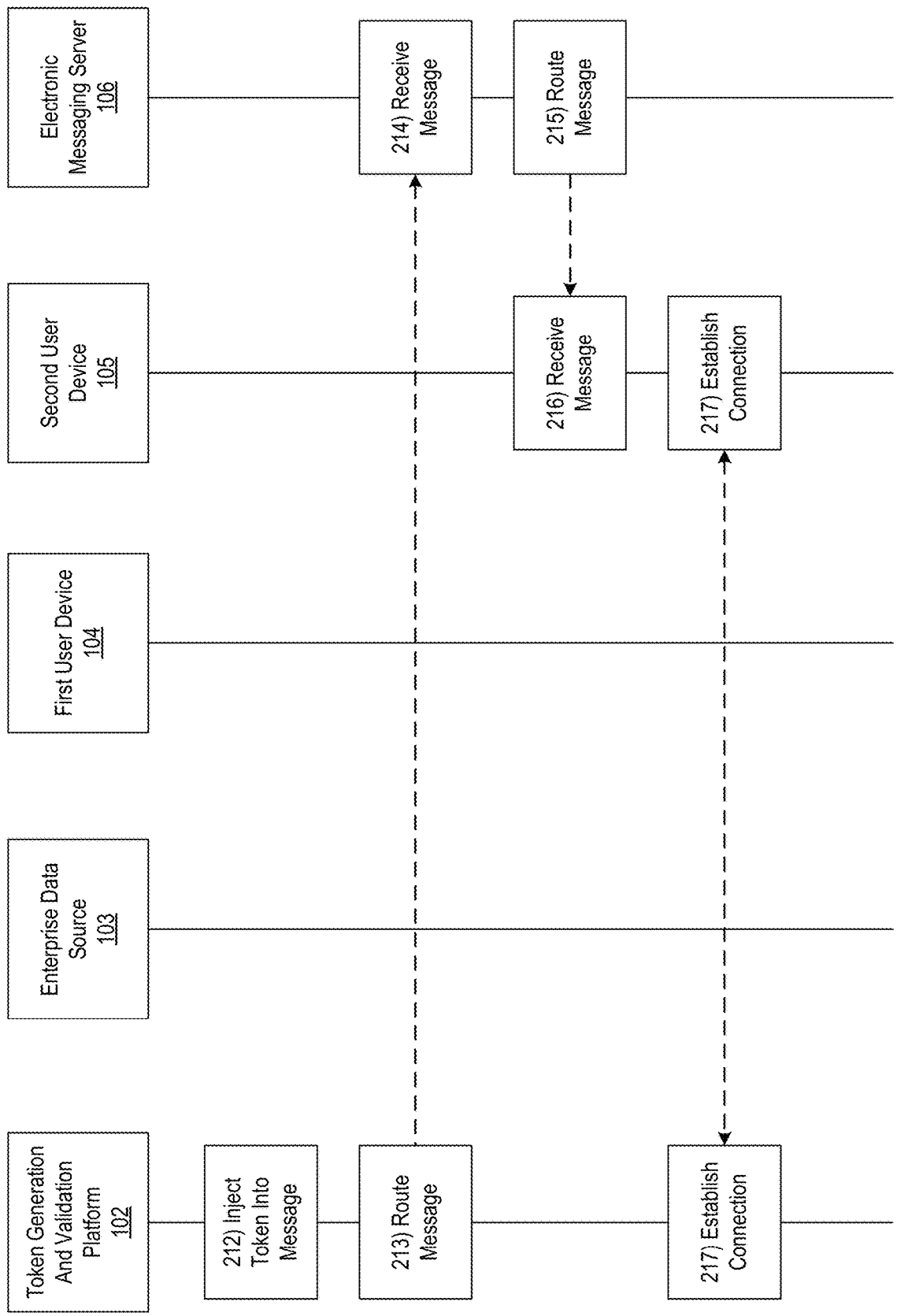

Referring to FIG. 2C, at step 212, the token generation and validation platform 102 may inject the authentication mechanism (e.g., the authentication or code generated at step 211) into the message. For example, the token generation and validation platform 102 may inject the authentication mechanism in a method that is transparent to the message recipient (e.g., the token may be attached to the message and automatically processed without further involvement from the recipient). Alternatively, the token generation and validation platform 102 may include the alpha-numeric code in the message in a manner that makes the code visible to the recipient (e.g., embed the code into the body of the message).

By injecting this authentication mechanism, the token generation and validation platform 102 may provide a method for authenticating messages that might not be circumvented by impersonators and/or spoofers. For example, such impersonators might not be able to replicate the authentication mechanism, and thus impersonated, spoofed, or otherwise malicious messages may be effectively identified (e.g., based on the lack of a verified authentication mechanism).

At step 213, the token generation and validation platform 102 may route the message to the electronic messaging server 106. For example, the token generation and validation platform 102 may route the message to the electronic messaging server 106 via the communication interface 113.

At step 214, the electronic messaging server 106 may receive the message sent at step 213. For example, the electronic messaging server 106 may receive the message, which now may include an embedded authentication mechanism.

At step 215, the electronic messaging server 106 may route the message to an account of the recipient (which may, e.g., be accessed by the second user device 105). At step 216, the second user device 105 may receive the message. In some instances, in receiving the message, the second user device 105 may receive the message using an electronic messaging service (which may e.g., be hosted by the electronic messaging server 106), and that may be configured with an authentication tool capable of processing the authentication mechanism (e.g., by way of automated backend communication with the token generation and validation platform 102). In some instances, the electronic messaging service may be configured with this authentication tool based on the user of the second user device 105 being an employee of the enterprise organization or otherwise enrolling in a message authentication service.

At step 217, the second user device 105 may establish a connection with the token generation and validation platform 102. For example, the second user device 105 may establish a third wireless data connection with the token generation and validation platform 102 to link the second user device 105 with the token generation and validation platform 102 (e.g., in preparation for sending an authentication request). In some instances, the second user device 105 may identify whether or not a connection is already established with the token generation and validation platform 102. If a connection is already established with the token generation and validation platform 102, the second user device 105 might not re-establish the connection. If a connection is not yet established with the token generation and validation platform 102, the second user device 105 may establish the third wireless data connection as described herein.

Figure 2D:
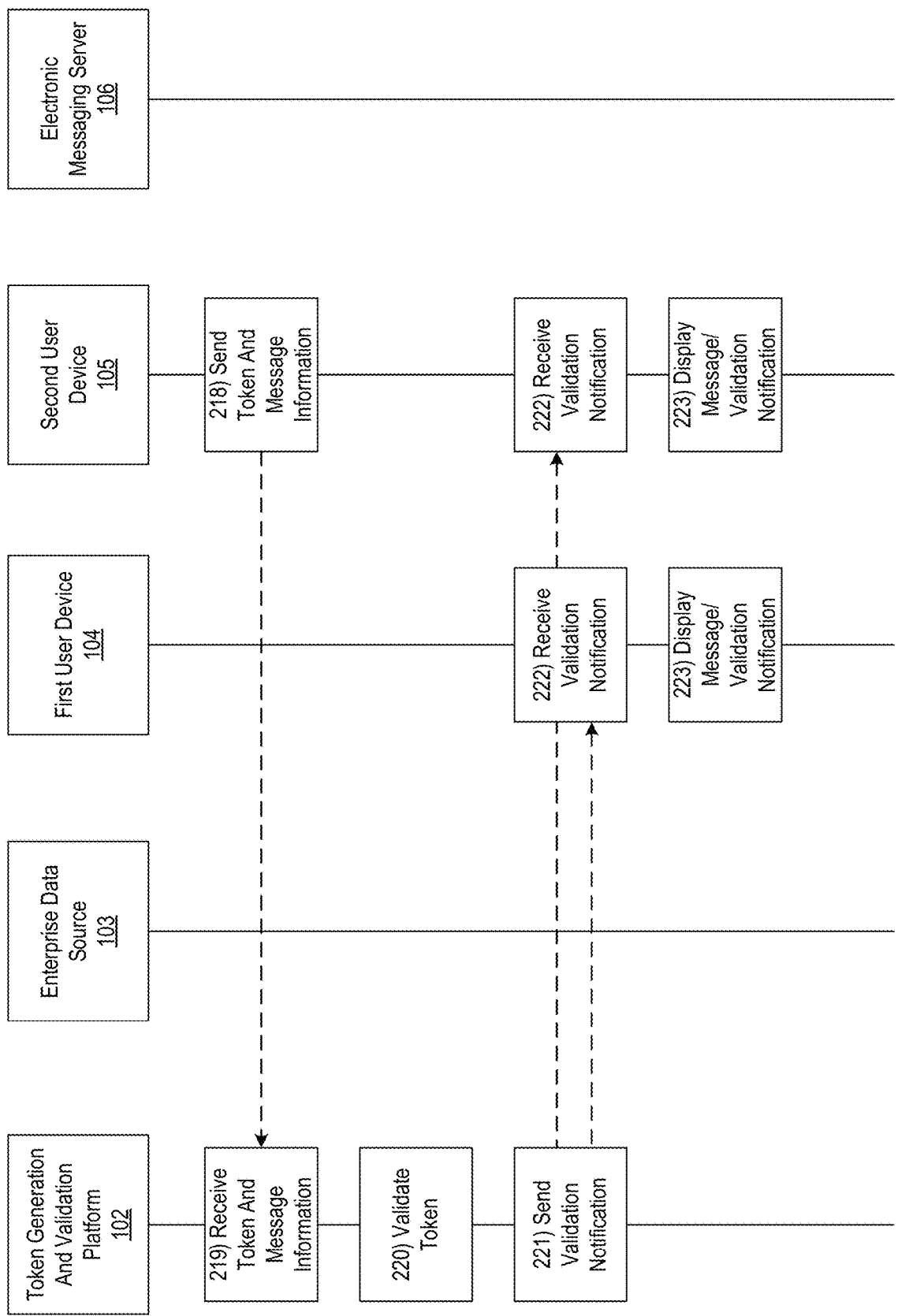

Referring to FIG. 2D, at step 218, the second user device 105 may send the authentication mechanism and message information to the token generation and validation platform 102. For example, the second user device 105 may send the authentication mechanism and message information to the token generation and validation platform 102 while the third wireless data connection is established. In some instances, in sending the message information, the second user device 105 may send a timestamp, date, number of attachments, attachments themselves, and/or other information.

In some instances, in sending the authentication mechanism, the second user device 105 may automatically send the authentication mechanism (e.g., an authentication token). For example, the second user device 105 and/or an account of the user of the second user device 105 (which may e.g., be accessed on the second user device 105) may be configured with backend processing resources that may automatically forward the authentication token to the token generation and validation platform 102. Alternatively, in sending the authentication mechanism, the second user device 105 may display a link (e.g., within the message), which may route the user of the second user device to a web portal, hosted or otherwise affiliated with the token generation and validation platform 102, into which the alpha-numeric code may be input (and thus sent to the token generation and validation platform 102). For example, the second user device 105 may display a graphical user interface similar to graphical user interface 405, which is shown in FIG. 4. Additionally or alternatively, the second user device 105 (or other device affiliated with the user of the second device) may include a mobile application linked to the token generation and validation platform 102, which may enable the message recipient to input the alpha-numeric code using the mobile application.

At step 219, the token generation and validation platform 102 may receive the authentication mechanism and the message information sent at step 218. For example, the token generation and validation platform 102 may receive the authentication mechanism and message information via the communication interface 113 and while the third wireless data connection is established.

At step 220, the token generation and validation platform 102 may validate the authentication mechanism. For example, the token generation and validation platform 102 may compare the authentication mechanism (e.g., the token, code, or other mechanism) that was received form the second user device 105 to the authentication mechanism embedded in the message. If the token generation and validation platform 102 identifies that the received authentication mechanism matches the sent authentication mechanism, the token generation and validation platform 102 may identify that the message is authenticated. Otherwise, the token generation and validation platform 102 may identify that the message is corrupt.

Additionally, in some instances, the token generation and validation platform 102 may compare the received message information to message information collected by the token generation and validation platform 102 (e.g., prior to routing the message with the embedded security mechanism). For example, the token generation and validation platform 102 may identify whether timestamps of the messages match, whether a date matches, whether any attachments match, whether links match, and/or other information. In doing so, the token generation and validation platform 102 may apply an additional layer of security to protect against scenarios in which an authentication token or code has been compromised and/or in which an old token or code (e.g., used for a different message) becomes compromised and/or reused, and is deployed in an attempt to authenticate an otherwise compromised message.

If the token generation and validation platform 102 successfully validates the authentication mechanism, the token generation and validation platform 102 may proceed to step 221. Otherwise, if the token generation and validation platform 102 is unable to validate the authentication mechanism, the token generation and validation platform 102 may proceed to step 224.

At step 221, the token generation and validation platform 102 may send a message validation notification to the first user device 104 and/or the second user device 105. For example, the token generation and validation platform 102 may send the message validation notification to the first user device 104 and/or the second user device 105 via the communication interface 113 and while one or more wireless data connections are established (e.g., between the token generation and validation platform 102 and the first user device 104 and/or the second user device 105). In some instances, the token generation and validation platform 102 may also send one or more commands directing the first user device 104 and/or the second user device 105 to display the message validation notification.

At step 222, the first user device 104 and/or second user device 105 may receive the message validation notification sent at step 221. For example, the first user device 104 and/or the second user device 105 may receive the message validation notification while a wireless data connection is established with the token generation and validation platform 102. In some instances, the first user device 104 and/or the second user device 105 may also receive the one or more commands directing the first user device 104 and/or the second user device 105 to display the message validation notification.

At step 223, based on or in response to the one or more commands directing the first user device 104 and/or the second user device 105 to display the message validation notification, the first user device 104 and/or the second user device 105 may display the message and/or the message validation notification. For example, in some instances, the first user device 104 and/or the second user device 105 may display the message along with the message validation notification, which may, e.g., indicate that the message has been successfully authenticated. For example, the second user device 105 may display a graphical user interface similar to graphical user interface 505, which is illustrated in FIG. 5.

Figure 2E:
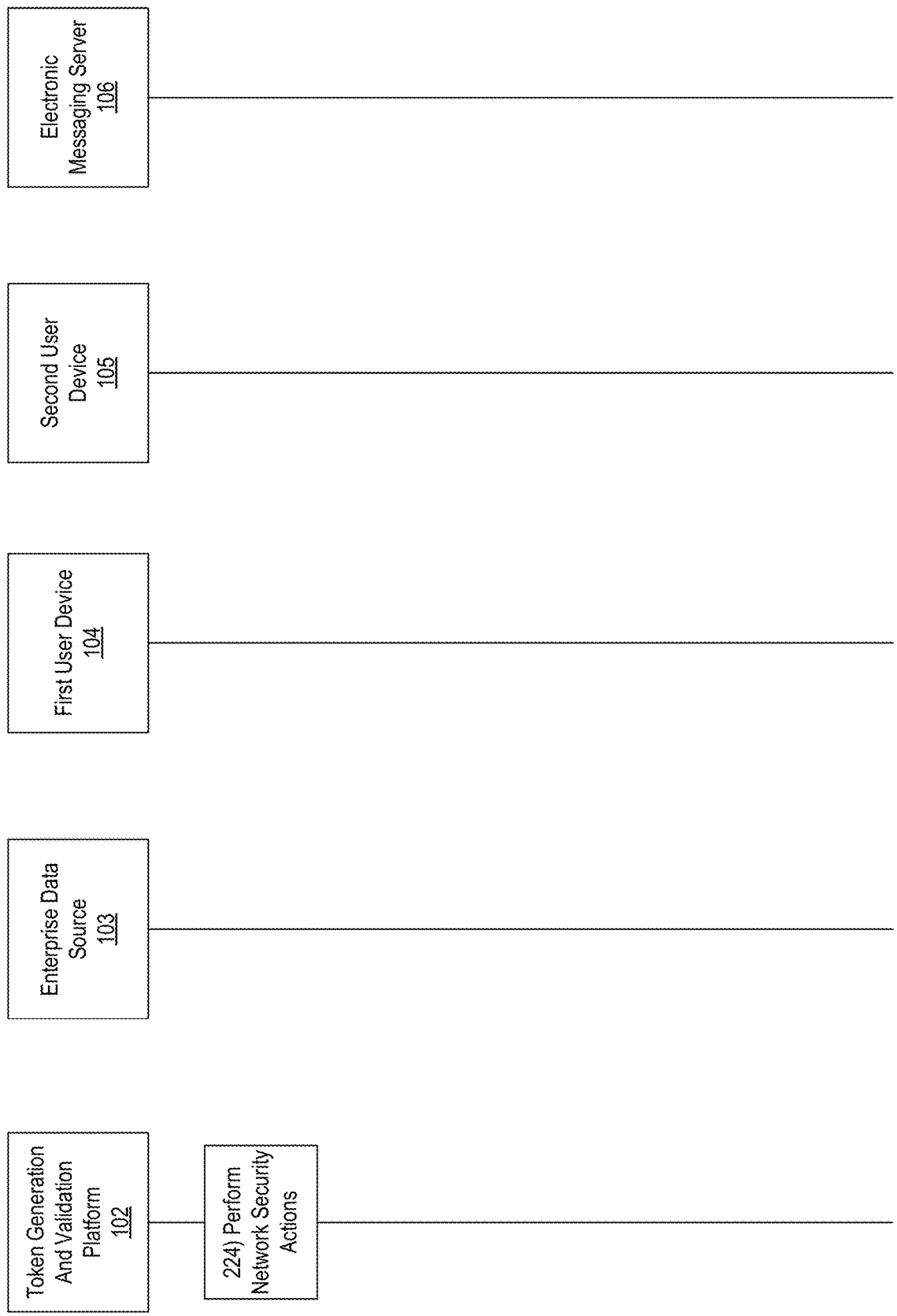

Referring to FIG. 2E, at step 224, based on identifying that the authentication mechanism was not validated, the token generation and validation platform 102 may perform one or more network security actions and/or otherwise cause one or more network security actions to be performed. For example, the token generation and validation platform 102 may quarantine the message, add the message sender to a list of suspicious senders, route the message to a sandbox for further analysis, notify the message sender and/or message recipient, send an request to the message sender and/or other enterprise personnel for a confirmation that a non-disclosure agreement has been obtained with an external entity corresponding to the message sender or recipient, quarantine a portion of the message (e.g., allow the message to be displayed, but prevent a link or attachment from being accessed, prevent replies to the message, and/or otherwise prevent further interaction with the message) and/or perform other actions.

Figure 3:
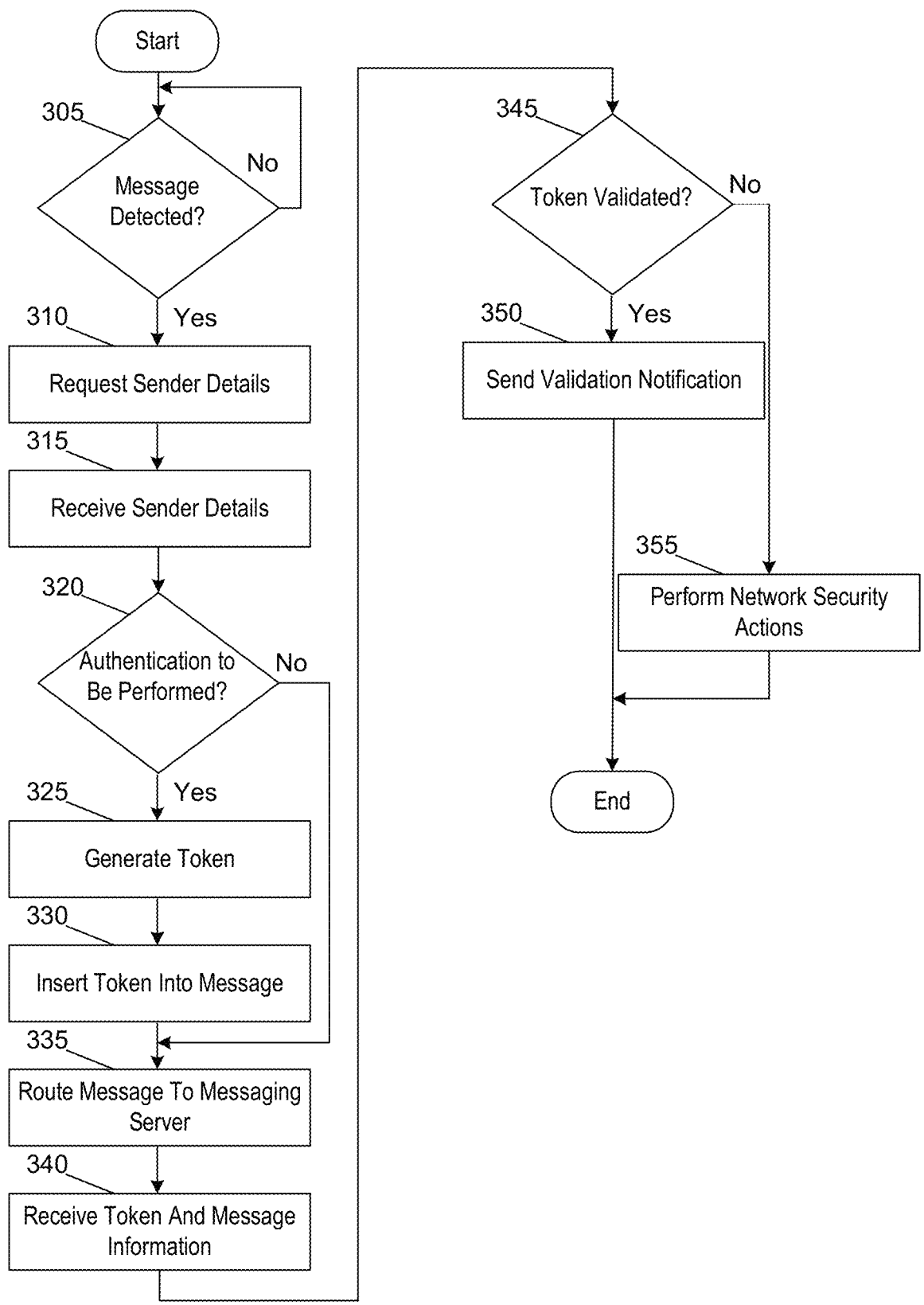
FIG. 3 depicts an illustrative method that uses token injection for message authentication in accordance with one or more example embodiments.

FIG. 3 depicts an illustrative method that uses token injection for message authentication in accordance with one or more example embodiments. Referring to FIG. 3, at step 305, a computing platform having at least one processor, a communication interface, and memory may detect whether or not a message has been received at an electronic messaging server. If not, the computing platform may wait to detect a message. If a message is detected, the computing platform may proceed to step 310. At step 310, the computing platform may request information about the message sender from an enterprise data source. At step 315, the computing platform may receive the information about the message sender. At step 320, the computing platform may identify whether or not authentication should be performed for the message. If so, the computing platform may proceed to step 325. If not, the computing platform may proceed to step 335.

At step 325, the computing platform may generate an authentication mechanism (e.g., token, code, or the like). At step 330, the computing platform may inject the authentication mechanism into the message. At step 335, the computing platform may route the message to the electronic messaging server. At step 340, the computing platform may receive, from a recipient user device, the authentication mechanism and message information. At step 345, the computing platform may identify whether or not the authentication mechanism is validated. If so, the computing platform may proceed to step 350. At step 350, the computing platform may send a message validation notification to the recipient user device.

Otherwise, returning to step 345, if the computing platform identifies that the authentication mechanism is not validated, the computing platform may proceed to step 355. At step 355, the computing platform may perform one or more network security actions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a message encryption score for a message directed by a first device to a second device, wherein generating the message encryption score for the message comprises applying the following model:
   the message encryption score (d)=a+b+c; and
   if d is greater than or equal to 0.6, generate authentication token, wherein:
   if number of matching keywords exceeds 3, a=0.3;
   if the number of matching keywords exceeds 1 but not 3, a=0.15, otherwise a=0,
   if message recipient matches, b=1, otherwise b=0, and
   if message context matches, b=0.5;
   based on identifying that the message encryption score exceeds a message encryption threshold, identify that an authentication token should be injected into the message;
   verify, based on message sender details, an identity of a sender of the message;
   generate, after verifying the identity of the sender of the message, the authentication token for the message;
   inject the authentication token into the message;
   route, to an electronic messaging server and after injecting the authentication token into the message, the message;
   receive, from the second device, a request to validate the message, wherein the request includes the authentication token and details of the message;
   identify, using the authentication token and the details of the message, that the message is authenticated; and
   send, to the second device, a message authentication notification and one or more commands directing the second device to display the message authentication notification along with the message, wherein sending the one or more commands directing the second device to display the message authentication notification along with the message causes the second device to display the message authentication notification along with the message.

2. The computing platform of claim 1, wherein identifying that the authentication token should be injected further comprises identifying that the authentication token should be injected into all outgoing messages.

3. The computing platform of claim 1, wherein identifying that the authentication token should be injected further comprises identifying that the authentication token should be injected based on analysis of sender information.

4. The computing platform of claim 3, wherein the sender information includes one or more of: a name of the sender, an email address of the sender, a job title of the sender, or a message encryption history of the sender.

5. The computing platform of claim 4, wherein the memory stores additional computer-readable instructions that, when executed by the at least one processor, cause the computing platform to:
   identify, using one or more machine learning algorithms, the message encryption history of the sender, wherein the message encryption history of the sender indicates one or more of keywords, recipients, or message context associated with previously sent messages from the sender that included an authentication token.

6. The computing platform of claim 5, wherein the message context is identified using natural language understanding (NLU) algorithms.

7. The computing platform of claim 5, wherein the memory stores additional computer-readable instructions that, when executed by the at least one processor, cause the computing platform to:
   generate a message encryption score for the message;
   compare the message encryption score to a message encryption threshold; and
   based on identifying that the message encryption score exceeds the message encryption threshold, identify that the authentication token should be injected.

8. The computing platform of claim 1, wherein receiving the request to validate the message comprises receiving a request from an automated electronic messaging plug-in that identified the authentication token in the message.

9. The computing platform of claim 1, wherein the details of the message include one or more of: a presence of an attachment, a presence of a hyperlink, or text of the message.

10. The computing platform of claim 1, wherein:
the message is displayed at the second device prior to identification that the message is authenticated,
the message includes one or more quarantined components,
the one or more quarantined components comprise one of more of: a hyperlink or an attachment, and
sending the message authentication notification and the one or more commands directing the second device to display the message authentication notification along with the message causes a quarantine to be removed from the one or more quarantined components.

11. The computing platform of claim 1, wherein the memory stores additional computer-readable instructions that, when executed by the at least one processor, cause the computing platform to:
receive the message from the electronic messaging server.

12. The computing platform of claim 1, wherein the memory stores additional computer-readable instructions that, when executed by the at least one processor, cause the computing platform to:
compare the message encryption score to the message encryption threshold.

13. The computing platform of claim 1, wherein identifying that the authentication token should be injected into the message comprises identifying that a number of hops involved in a transmission path of the message exceeds a predetermined number of hops.

14. A method comprising
at a computing platform comprising at least one processor, a communication interface, and memory:
generating a message encryption score for a message directed by a first device to a second device, wherein generating the message encryption score for the message comprises applying the following model:
the message encryption score (d)=a+b+c; and
d is greater than or equal to 0.6, generate authentication token, wherein:
number of matching keywords exceeds 3, a=0.3; the number of matching keywords exceeds 1 but not 3, a=0.15, otherwise a=0,
message recipient matches, b=1, otherwise b=0, and
message context matches, b=0.5;
based on identifying that the message encryption score exceeds a message encryption threshold, identifying that an authentication token should be injected into the message;
verifying, based on message sender details, an identity of a sender of the message;
generating, after verifying the identity of the sender of the message, the authentication token for the message;
injecting the authentication token into the message;
routing, to an electronic messaging server and after injecting the authentication token into the message, the message;
receiving, from the second device, a request to validate the message, wherein the request includes the authentication token and details of the message;
identifying, using the authentication token and the details of the message, that the message is authenticated; and
sending, to the second device, a message authentication notification and one or more commands directing the second device to display the message authentication notification along with the message, wherein sending the one or more commands directing the second device to display the message authentication notification along with the message causes the second device to display the message authentication notification along with the message.

15. The method of claim 14, wherein identifying that the authentication token should be injected further comprises identifying that the authentication token should be injected into all outgoing messages.

16. The method of claim 14, wherein identifying that the authentication token should be injected further comprises identifying that the authentication token should be injected based on analysis of sender information.

17. The method of claim 16, wherein the sender information includes one or more of: a name of the sender, an email address of the sender, a job title of the sender, or a message encryption history of the sender.

18. The method of claim 14, further comprising:
identifying, using one or more machine learning algorithms, the message encryption history of the sender, wherein the message encryption history of the sender indicates one or more of keywords, recipients, or message context associated with previously sent messages from the sender that included an authentication token.

19. The method of claim 18, wherein the message context is identified using natural language understanding (NLU) algorithms.

20. One or more non-transitory computer-readable media storing instructions that, when executed by a computing platform comprising at least one processor, a communication interface, and memory, cause the computing platform to:
generate a message encryption score for a message directed by a first device to a second device, wherein generating the message encryption score for the message comprises applying the following model:
the message encryption score (d)=a+b+c; and
if d is greater than or equal to 0.6, generate authentication token, wherein:
if number of matching keywords exceeds 3, a=0.3; if the number of matching keywords exceeds 1 but not 3, a=0.15, otherwise a=0,
if message recipient matches, b=1, otherwise b=0, and
if message context matches, b=0.5;
based on identifying that the message encryption score exceeds a message encryption threshold, identify that an authentication token should be injected into the message;
verify, based on message sender details, an identity of a sender of the message;
generate, after verifying the identity of the sender of the message, the authentication token for the message;
inject the authentication token into the message;
route, to an electronic messaging server and after injecting the authentication token into the message, the message;
receive, from the second device, a request to validate the message, wherein the request includes the authentication token and details of the message;
identify, using the authentication token and the details of the message, that the message is authenticated; and
send, to the second device, a message authentication notification and one or more commands directing the second device to display the message authentication notification along with the message, wherein sending the one or more commands directing the second device to display the message authentication notification along with the message causes the second device to display the message authentication notification along with the message.

\* \* \* \* \*